Patented Sept. 16, 1930

1,776,193

UNITED STATES PATENT OFFICE

WILHELM PUNGS, OF LUDWIGSHAFEN-ON-THE-RHINE, AND ERICH FRESE, OF NEUROESSEN, GERMANY, ASSIGNORS TO I. G. FARBENINDUSTRIE AKTIENGESELL-SCHAFT, OF FRANKFORT-ON-THE-MAIN, GERMANY, A CORPORATION OF GERMANY

PRODUCTION OF SOLID LUBRICANTS

No Drawing. Application filed April 25, 1929, Serial No. 358,155, and in Germany May 9, 1928.

The present invention relates to the production of solid lubricants.

We have found that valuable solid lubricants, such as solid greases, consistent fats and the like are obtained by mixing an oily material which is liquid at room temperature, such as tar oils, or mineral, animal or vegetable oils, or mixtures thereof, with bleached Montan wax or a conversion product thereof, or mixtures of the same, the free acids contained in such bleached wax or product being neutralized by means of alkali.

A suitable method of operating according to the present invention, consists, for example, in dissolving such bleached Montan wax in an oily material which is liquid at room temperature, such as mineral, rape or train oil while heating and stirring in an amount of an alkali, such as alkali metal hydroxide or carbonate, dissolved in a little water, corresponding to the quantity of free fatty acids present in the said bleached wax or conversion product thereof. According to the amount of Montan wax added which may, for example, be from about 1 to 30 per cent by weight of the amount of oil employed and the character of the initial oil, solid greases of any consistency may be produced, with flow points ranging from 75° to 200° C. or even more. The said bleached Montan wax is prepared by treating crude or deresinified Montan wax with a solution of a bleaching agent, such as hydrogen peroxide, a permanganate or, preferably, chromic acid. Instead of the crude bleached Montan wax the conversion products obtainable therefrom by neutralization e. g. by esterification, for example with a polyhydric alcohol, or saponification or by both these processes conjointly may be employed. In the latter case the addition of alkali may be a very small one or it may be dispensed with when the saponified bleached Montan wax or the esterified and saponified wax already contains alkali metal salts of its carboxylic acids.

The quantity of the bleached Montan wax or its conversion products employed usually amounts to from 2 to 25 per cent by weight of the oil employed, but in most cases about 10 per cent will give very satisfactory results which, however, depend on the nature of the initial oily material.

The following examples will further illustrate the nature of the said invention which, however, is not limited thereto. The parts are by weight.

Example 1

80 parts of mineral oil, 5 parts of rape oil and 8.5 parts of a Montan wax bleached by oxidation by means of chromic acid and having the acid value 140, are mixed together and warmed to 100° C. until a perfectly clear solution is formed. The solution is allowed to cool down to about 75° C. and a solution of 1 to 1.2 parts of sodium hydroxide in 5 to 6 parts of water is added, in a thin stream while vigorously stirring, a perfect emulsion being formed immediately. The stirring is then interrupted and the mass allowed to cool, furnishing a solid grease with a flow point of about 90° C. Instead of the mixture of mineral and rape oil a fish oil, such as train oil can be employed.

Example 2

10 parts of a product obtained by esterification with ethylene glycol of a Montan wax bleached by oxidation and then showing an acid number of 20, are dissolved in 100 parts of a mineral fuel oil, and mixed while stirring at about 90° C. with 0.5 part of sodium hydroxide dissolved in 12 parts of water. After a short time a solid grease of the consistency of soft soap is formed showing a flow point of 143° C.

Example 3

100 parts of a mineral or synthetic oil possessing a viscosity of 6° Engler at 20° C. and a flash point of 180° C., such as is employed in ice producers, is warmed to about 90° C. and mixed with 8 parts of a Montan wax bleached and subsequently partly esterified with glycerol and partly converted into a calcium salt, for example in accordance with the U. S. application Ser. No. 247,454, filed January 1, 1928, whereupon a solution of 1 part of caustic soda in 5 parts of water are intensely stirred into the mixture. After cooling a solid grease is obtained which shows the consistency of soft soap and a flow point of 153° C.

What we claim is:

1. The process for the production of solid lubricants, which comprises incorporating, while heating, an oily material, which is liquid at room temperature, with bleached Montan wax and adding a quantity of an alkali neutralizing free acids contained in the said bleached Montan wax.

2. A solid lubricant comprising an oily material which is liquid at room temperature, and from 1 to 30 per cent its weight of bleached Montan wax the free acids of which are neutralized.

3. A solid lubricant comprising an oily material which is liquid at room temperature, and from 1 to 30 per cent its weight of bleached Montan wax the free acids of which are neutralized by means of alkali.

4. A solid lubricant comprising an oily material which is liquid at room temperature, and from 1 to 30 per cent its weight of bleached Montan wax the free acids of which are neutralized by means of alkali and a polyhydric alcohol.

5. A solid lubricant comprising a mineral oil which is liquid at room temperature, and about 10 per cent its weight of bleached Montan wax the free acids of which are neutralized.

6. A solid lubricant comprising a mixture of a mineral and a vegetable oil which is liquid at room temperature, and about 10 per cent its weight of bleached Montan wax the free acids of which are neutralized.

7. A solid lubricant comprising a mineral oil which is liquid at room temperature, and about 10 per cent its weight of bleached Montan wax the free acids of which are neutralized with gylcerol, calcium hydroxide and sodium hydroxide.

In testimony whereof we have hereunto set our hands.

WILHELM PUNGS.
ERICH FRESE.